United States Patent [19]

Sugano

[11] Patent Number: 4,930,372
[45] Date of Patent: Jun. 5, 1990

[54] SYSTEM FOR ENGAGING LOCK-UP CLUTCH AT HIGHEST SPEED RATIOS OF DIFFERENT OPERATION RANGES

[75] Inventor: Kazuhiko Sugano, Yokohama, Japan

[73] Assignee: Nissan Motor Co., Ltd., Yokohama, Japan

[21] Appl. No.: 264,850

[22] Filed: Oct. 31, 1988

[30] Foreign Application Priority Data

Oct. 30, 1987 [JP] Japan ................ 62-273213

[51] Int. Cl.$^5$ .......................................... F16H 47/00
[52] U.S. Cl. ..................................... 475/65; 192/3.3; 192/3.31
[58] Field of Search .............. 74/733, 732, 731, 730, 74/869, 868; 192/3.3, 3.31, 0.052, 0.044

[56] References Cited

U.S. PATENT DOCUMENTS

| | | | |
|---|---|---|---|
| 3,497,043 | 2/1970 | Leonard | 192/3.3 X |
| 4,051,932 | 10/1977 | Arai et al. | 192/3.3 |
| 4,095,486 | 6/1978 | Ohnuma | 74/733 X |
| 4,289,048 | 9/1981 | Mikel et al. | 74/733 |
| 4,367,812 | 1/1983 | Kobayashi et al. | 192/3.3 |
| 4,391,166 | 7/1983 | Kubo et al. | 74/869 |
| 4,561,528 | 12/1985 | Sugano | 192/3.31 X |
| 4,585,100 | 4/1986 | Sugano | 192/3.31 |
| 4,585,102 | 4/1986 | Sugano | 192/3.31 |
| 4,595,088 | 6/1986 | Sugano | 192/0.076 |
| 4,607,731 | 8/1986 | Sugano | 192/3.29 |

FOREIGN PATENT DOCUMENTS

| | | | |
|---|---|---|---|
| 59-23152 | 2/1984 | Japan | 192/3.31 |
| 60-8566 | 1/1985 | Japan | 192/3.3 |
| 60-179568 | 9/1985 | Japan | 192/3.3 |
| 60-211161 | 10/1985 | Japan | 192/3.3 |
| 61-96259 | 5/1986 | Japan . | |

Primary Examiner—Allan D. Herrmann
Assistant Examiner—Chris Campbell
Attorney, Agent, or Firm—Foley & Lardner, Schwartz, Jeffery, Schwaab, Mack, Blumenthal & Evans

[57] ABSTRACT

A system for controlling a lock-up clutch of a torque converter comprises a lock-up control valve, and a shuttle valve. The lock-up control valve includes a spool having a first and a second pressure acting areas. The shuttle valve delivers an output hydraulic pressure when at least one of two inlet ports is pressurized. One of the inlet ports is subject to a first hydraulic pressure which builds up at a band brake during operation with the fourth speed ratio, while the other inlet port is subject to a second hydraulic pressure which builds up at an overrun clutch during operation with the third, second, and first speed ratios when an engine brake operation range is selected. The output hydraulic pressure of the shuttle valve is transmitted to the lock-up control valve to act on the second pressure acting area. The first pressure acting area is subject to a third hydraulic pressure which builds up at a high clutch during operation with each of the third and fourth speed ratios. The lock-up control valve includes a spring biasing the spool toward a first position where the lock-up clutch is released. The spring allows movement of the spool toward a second position where the lock-up clutch is engaged when the first and second pressure acting areas are subject to the hydraulic pressures.

5 Claims, 4 Drawing Sheets

FIG. 3

| | | R/C | H/C | F/C | O/C | B/B 2A | B/B 3R | B/B 4A | L&R/B | F/O | L/O | GEAR RATIO | α1 = 0.45, α2 = 0.45 |
|---|---|---|---|---|---|---|---|---|---|---|---|---|---|
| D RANGE | ENGINE DRIVING 1ST | | | O | | | | | | O | O | $\frac{1+\alpha_1}{\alpha_1}$ | 3.22 |
| | ENGINE DRIVING 2ND | | O | O | | O | | | | O | | $\frac{\alpha_1+\alpha_2+\alpha_1\alpha_2}{\alpha_1(1+\alpha_2)}$ | 1.69 |
| | ENGINE DRIVING 3RD | | O | O | O | | | | | O | | 1 | 1 |
| | ENGINE DRIVING 4TH | | | (O) | O | | | O | | | | $\frac{1}{1+\alpha_2}$ | 0.69 |
| | ENGINE BRAKING 1ST | | | (O) | | | O | | | | | | |
| | ENGINE BRAKING 2ND | | O | (O) | O | O | O | | | | | | |
| | ENGINE BRAKING 3RD | | O | (O) | O | | O | | | | | | |
| | ENGINE BRAKING 4TH | | | (O) | O | | | O | | | | | |
| 2 ND RANGE | 1ST | | | O | | O | | | | O | O | | |
| | 2ND | | | O | | O | | | | O | | | |
| 1 ST RANGE | 1ST | | | O | | | | | O | O | | | |
| REVERSE | | O | | | | | | | O | | | $-\frac{1}{\alpha_2}$ | -2.22 |

( ) UNRELATED TO POWER TRANSMISSION

4,930,372

SYSTEM FOR ENGAGING LOCK-UP CLUTCH AT HIGHEST SPEED RATIOS OF DIFFERENT OPERATION RANGES

BACKGROUND OF THE INVENTION

The present invention relates to a system for controlling a lock-up clutch of a torque converter followed by an automatic transmission.

Hydraulic systems for controlling a lock-up clutch of a torque converter followed by an automatic transmission are well known. A representative one is disclosed in JP 61-96259, for example. This lock-up clutch controlling system comprises a lock-up control valve and a range control valve which are related such that the lock-up clutch is ready for activation during operation with the highest speed ratio of each of two selectable operation ranges. That is, in the case where the fourth speed ratio is an overdrive, a lock-up clutch becomes ready for activation during operation with the fourth speed ratio only when a predetermined operation range where an engine brake is not used is selected. On the contrary, when another operation range is selected by pressing an overdrive inhibitor button where the engine brake is used and the fourth speed ratio is prohibited, the lock-up clutch becomes ready for activation during operation with the third speed ratio only. Thus, the lock-up clutch becomes ready for activation during operation with the highest or third speed ratio only when this operation range where the overdrive is inhibited is selected.

However, this known lock-up clutch controlling system has a problem that the installation space for the range control valve is difficult to find and the range control valve is as expensive as the other component valves. This increases size and manufacturing cost of the whole hydraulic control system employing the lock-up clutch controlling system. Describing further in detail, the range control valve is constructed and arranged such that it permits the passage of a third speed ratio hydraulic pressure in the case where a fourth speed ratio prohibition hydraulic pressure is not available, while it prohibits the passage of the third speed ratio hydraulic fluid pressure in the case where the fourth speed ratio prohibition hydraulic pressure is available. The hydraulic fluid pressure delivered by the range control valve acts on the lock-up control valve in opposed relationship with the third and fourth speed ratio hydraulic pressures, controlling a shift of the lock-up control valve. This results in providing the above-mentioned operation. However, the fact that the range control valve has to be provided separately, as a single additional valve, only for the purpose of selectively allowing supply or discharge of the third speed ratio hydraulic pressure to and from the lock-up control valve causes the above-mentioned problem.

An object of the present invention is to improve a lock-up clutch controlling system such that the above-mentioned function is provided without the range control valve.

SUMMARY OF THE INVENTION

According to the present invention, there is provided a system for controlling a lock-up clutch of a torque converter followed by an automatic transmission of a vehicle. The automatic transmission is shiftable between a plurality of speed ratios including a nth speed ratio and a n−1th speed ratio, where: n is an integer, and includes a first friction device which is the subject to a first hydraulic pressure during operation with the nth speed ratio when a first predetermined operation range is selected, a second friction device which is subject to a second hydraulic pressure during operation with the n−1th speed ratio when a second predetermined operation range is selected, and a third friction device which is subject to a third hydraulic pressure during operation with each of the nth speed ratio and the n−1th speed ratio when either one of the first or second predetermined operation ranges is selected. The lock-up clutch controlling system comprises a shuttle valve having a first inlet port subject to the first hydraulic pressure, a second inlet port subject to the second hydraulic pressure, and an outlet port, said shuttle valve including means for delivering an output hydraulic pressure when at least one of said first and second inlet ports is pressurized. Also, a lock-up control valve including a spool movable between a first position where the lock-up clutch is released, and a second position where the lock-up clutch is engaged, said lock-up control valve including means for biasing said spool toward said first position, said spool having a first pressure acting area, and a second pressure acting area. In addition, means for transmitting the third hydraulic pressure to said lock-up control valve to have the third hydraulic pressure to act on said first pressure acting area of said spool in such a direction as to urge said spool against said biasing means and means for transmitting said output hydraulic pressure to said lock-up control valve to have said output hydraulic pressure to act on said second pressure acting area of said spool in such a direction as to urge said spool against said biasing means. These said biasing means being so constructed and arranged as to allow movement of said spool to said second position when the third hydraulic pressure acts on said first pressure acting area and said output hydraulic pressure acts on said second pressure acting area.

More specifically, according to the embodiment, there is provided a system for controlling a lock-up clutch of a torque converter followed by an automatic transmission of a vehicle. The automatic transmission is shiftable between four speed ratios including a fourth speed ratio and a third speed ratio, and includes a band brake which is subject to a first hydraulic pressure during operation with the fourth speed ratio when an engine brake operation range is not selected, an overrunning clutch which is subject to a second hydraulic pressure during operation with the third speed ratio when the engine brake operation range is selected, and a high clutch which is subject to a third hydraulic pressure during operation with each of the fourth speed ratio and the third speed ratio regardless of whether or not the engine brake operation range is selected. The lock-up clutch controlling system comprises a shuttle valve having a first inlet port subject to the first hydraulic pressure, a second inlet port subject to the second hydraulic pressure, and an outlet port, said shuttle valve including means for delivering an output hydraulic pressure when at least one of said first and second inlet ports is pressurized. Also, a lock-up control valve including a spool movable between a first position where the lock-up clutch is released, and a second position where the lock-up clutch is engaged, said lock-up control valve including means for biasing said spool toward said first position, said spool having a first pressure acting area, and a second pressure acting area. In addition, means for transmitting the third hydraulic pressure to said lock-up control valve to have the third hydraulic pressure to act on said first pressure acting area of said spool in such a direction as to urge said spool against said biasing means; and means for transmitting said output hydraulic pressure to said lock-up control valve to have said output hydraulic pressure to act on said second pressure acting area of said spool in such a direction as to urge said spool against said biasing means. Also, a said biasing means being so constructed and arranged as to allow movement of said spool to said second position when the third hydraulic pressure acts on said first pressure acting area and said output hydraulic pressure acts on said second pressure acting area.

As now is clear, the lock-up clutch is engaged during operation with the nth or fourth speed ratio when the first predetermined operation range is selected, while it is engaged during operation with the n−1th or the third speed ratio when another predetermined operation range is selected. The function is accomplished by the system including a shuttle valve instead of the range control valve. Since the shuttle valve is less complicated and more reliable in operation than the range control valve, the reliability of the system is enhanced.

BRIEF DESCRIPTION OF THE DRAWINGS

FIG. 3 is a table showing a shift schedule of the automatic transmission; and

DETAILED DESCRIPTION OF THE INVENTION

Figure 2:
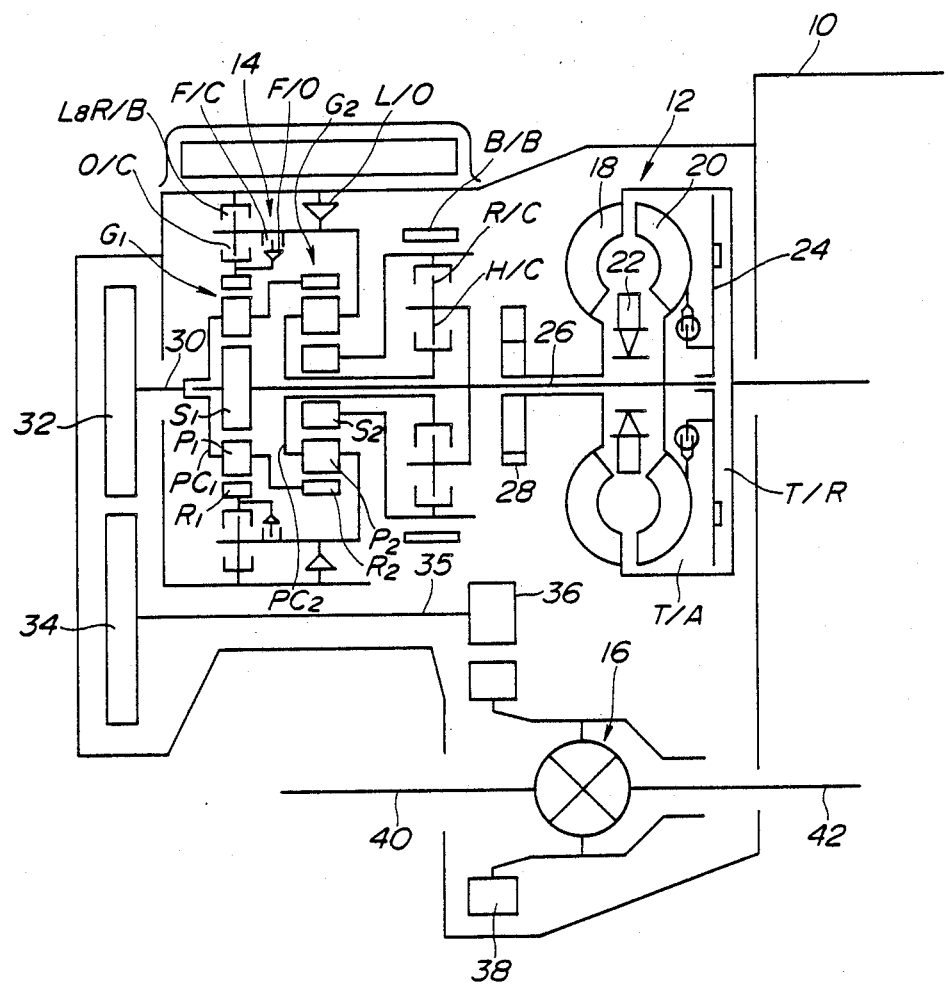
FIG. 2 is a diagram line of a power train of a transaxle including the automatic transmission.

Referring to FIG. 2, there is shown a diagram line of an automatic transmission (automatic transaxle). That is, the reference numeral 10 designates an engine which is suitable for transverse mount with regard to the longitudinal direction of a vehicle. Torque of the engine is supplied to a torque converter 12 on a pump impeller 18 thereof. In addition to the torque converter 12, the automatic transmission comprises a change speed planetary gear box 14, and a differential unit 16. In addition to the pump impeller 18, the torque converter 12 includes a turbine runner 20 and a stator 22. It also includes a lock-up clutch 24 for establishing a mechanical drive connection between the pump impeller 18 and turbine runner 20. When the lock-up clutch 24 is disengaged or released, torque is transmitted via hydraulic fluid from the pump impeller 18 to the turbine runner 20 and then to a transmission input shaft 26 drivingly connected to the turbine runner 20. When the lock-up clutch 24 is engaged, the torque is transmitted via a mechanical connection between the pump impeller 18 and turbine runner 20 to the input shaft 26. The lock-up clutch 24 is activated in response to a pressure differential between an apply chamber T/A and a release chamber T/R. The pump impeller 18 is drivingly connected to an oil pump 28 so that the engine drives the oil pump 28.

The change speed planetary gear box 14 comprises a first planetary gear set $G_1$ and a second planetary gear set $G_2$. The first planetary gear set $G_1$ includes a first sun gear $S_1$, a first internal or ring gear $R_1$, and a first planet pinion carrier $PC_1$. The first planet pinion carrier $PC_1$ rotatably supports at least one planet pinion $P_1$ meshing with the sun and ring gears $S_1$ and $R_1$. The second planetary gear set $G_2$ comprises a second sun gear $S_2$, a second internal or ring gear $R_2$, and a second planet pinion carrier $PC_2$. The second planet pinion carrier $PC_2$ rotatably supports at least one planet pinion $P_2$ meshing with the second sun and ring gears $S_2$ and $R_2$. The first sun gear $S_1$ is drivingly connected to the input shaft 26, while the first pinion carrier $PC_1$ and second ring gear $R_2$ are drivingly connected to a transmission output shaft 30.

Via a serially connected forward one-way clutch F/O and forward clutch F/C, the first ring gear $R_1$ is drivingly connectable to the second pinion carrier $PC_2$. An overrunning clutch O/C is arranged in parallel to the serially connected forward one-way clutch F/O and forward clutch F/C. Via this overrunning clutch O/C, the first ring gear $R_1$ is drivingly connectable to the second pinion carrier $PC_2$. The second sun gear $S_2$ is drivingly connectable via a reverse clutch R/C to the input shaft 26. The second pinion carrier $PC_2$ is drivingly connectable via a high clutch H/C to the input shaft 26. The second sun gear $S_2$ is adapted to be held stationary relative to a transmission casing via a band brake B/B. The second pinion carrier $PC_2$ is adapted to be held stationary relative to the casing via a low one-way clutch L/O or a low and reverse brake L and R/B which is arranged in parallel to the low one-way clutch L/O. The output shaft 30 has an output gear 32 rotatable therewith. An idler shaft 35 is rotatably mounted in the transmission casing and extends in parallel to the output shaft 30. An idler gear 34 is connected to the idler shaft 35 for rotation therewith at one end portion thereof. At the opposite end portion, the idler shaft 35 has a reduction gear 36 for rotation therewith. The idler gear 34 is in mesh with the output gear 32, while the reduction gear 36 in mesh with a ring gear 38 of the differential unit 16. The differential unit 16 has drive axles 40 and 42 extending outward in opposite directions. These drive axles 40 and 42 are drivingly connected to a left front wheel and a right front wheel, respectively.

In the change speed planetary gear box 14, varying a selected one or a selected combination of the clutches F/C, H/C, O/C, and R/C, the brakes B/B and L&R/B, and the one-way clutches F/O and L/O which are to be activated or engaged will cause a shift in rotating state of planetary gear elements $S_1$, $S_2$, $R_1$, $R_2$, $PC_1$, and $PC_2$ of the planetary gear sets $G_1$ and $G_2$, causing a change in the rotational speed of the output shaft 30 relative to the rotational speed of the input shaft 26. More specifically, activating one of or a combination of the clutches, brakes, and one-way clutches in a schedule as illustrated in the TABLE in FIG. 3 will cause a shift between four forward speed ratios in various modes and a reverse speed ratio. In FIG. 3, the sign o indicates that a particular frictional device is activated or engaged. If the particular friction device is a clutch or a brake, the above-mentioned sign o indicates the engagement of the clutch or brake, while if the particular friction device is a one-way clutch, the sign o indicates activation of the one-way clutch. The reference numerals 2A, 3R, and 4A arranged in a row below the reference numeral B/B indicate a second speed apply chamber 2A, a third speed release chamber 3R and a fourth speed apply chamber 4A of a hydraulic pressure operated servomotor for tightening the band brake B/B. The reference sign o indicates supply of hydraulic fluid pressure to a particular chamber. The reference characters $\alpha_1$ (alpha one) and $\alpha_2$ (alpha two) express a ratio of number of teeth of the sun gear $S_1$ to number of teeth of the ring gear $R_1$, and a ratio of number of teeth of the sun gear $S_2$ to number of teeth of the ring gear $R_2$, respectively. A gear ratio is a ratio of rotational speed of the input shaft 26 to rotational speed of the output shaft 30.

Owing to the change speed operation by the planetary gear box 14, rotating the input shaft 26 at a rotational speed causes the output shaft 30 to rotate at a rotational speed decreased or increased from the rotational speed of the input shaft 26. Torque of the output shaft 30 is transmitted via an output gear 32, idler gear 34, reduction gear 36 to the ring gear 38 of the differential unit 16. This causes the drive axles 40 and 42 to drive the left and right front wheels 40 and 42. As a result, an automatic shift among four forward speed ratios including an overdrive can be effected.

Figure 4:
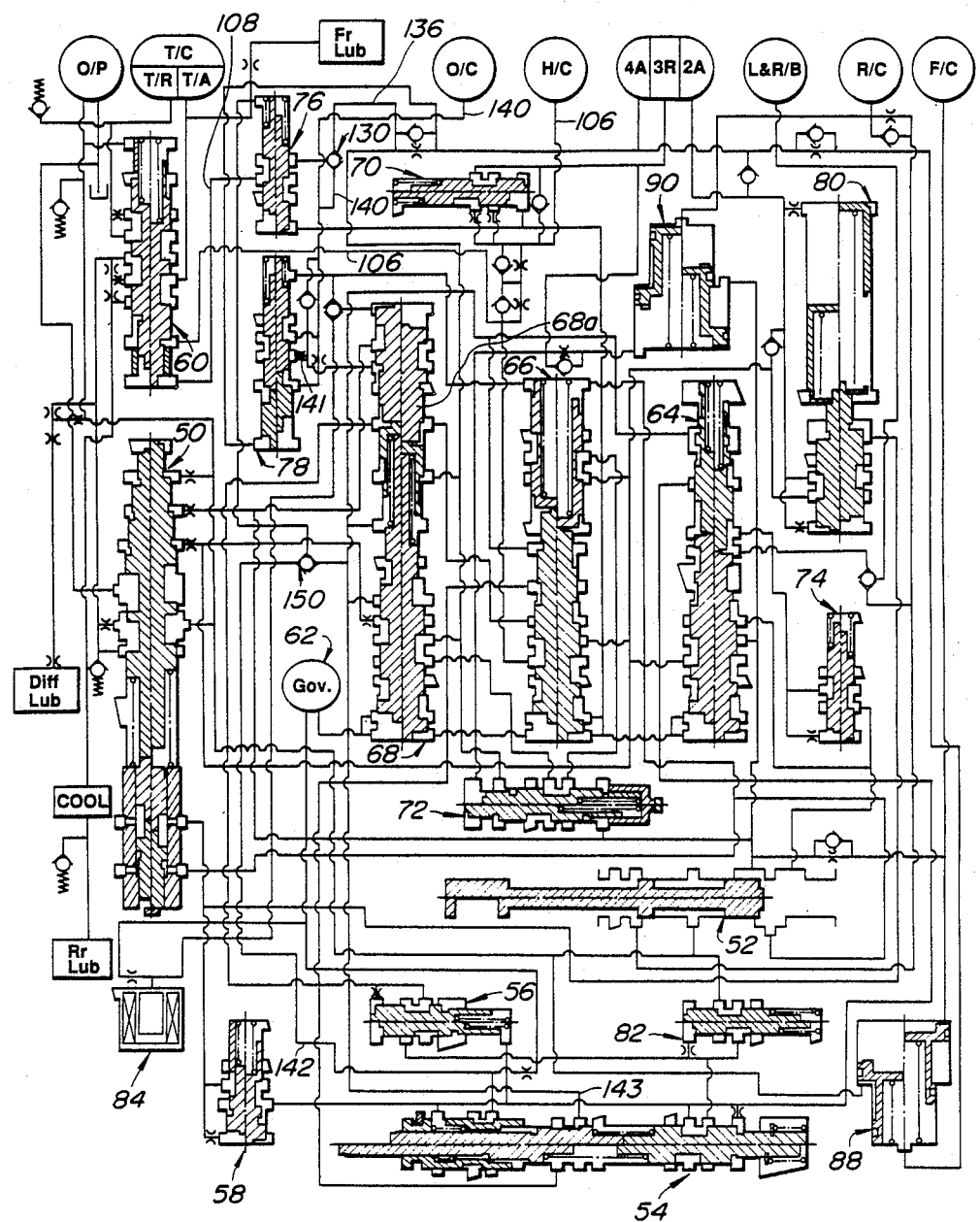
FIG. 4 is a hydraulic circuit of the hydraulic control system for the automatic transmission.

FIG. 4 shows a hydraulic circuit of a hydraulic control system for controlling the above-mentioned power train.

This hydraulic control system comprises the following valves: a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-4 shift valve plug 68a, a 3-2 timing valve 70, a 4-2 sequence valve 72, a manual first range pressure reduction valve 74, a vehicle speed cutoff valve 76, an overrunning clutch control valve 78, a 1-2 accumulator valve 80, a kickdown modifier valve 82, an overdrive inhibitor solenoid 84, a N-D accumulator 88, a servo release accumulator 90, shuttle valve 130, and a shuttle valve 150. These valves are operatively interconnected as illustrated in FIG. 4. They are connected also to an oil pump O/P, the apply chamber T/A and the release chamber T/R of the torque converter 12, the clutches R/C. H/C, O/C, and F/C, the brake L&R/B, and three chambers 2A, 3R, and 4A of the band brake B/B as illustrated in FIG. 4. Owing to this circuit structure, the appropriate one or the appropriate combination of the clutches R/C, H/C, O/C, and F/C, and the brakes L and R/B and B/B which are to be engaged is selected in response to vehicle speed and opening degree of the engine throttle. In this disclosure, such valves which are not directly concerned with the present invention are not specifically described. The following explanation proceeds along FIG. 1 which illustrates such valves and portions, extracted from the whole system, which have close connection with the present invention in order to make it easy to understand the present invention.

Figure 1:
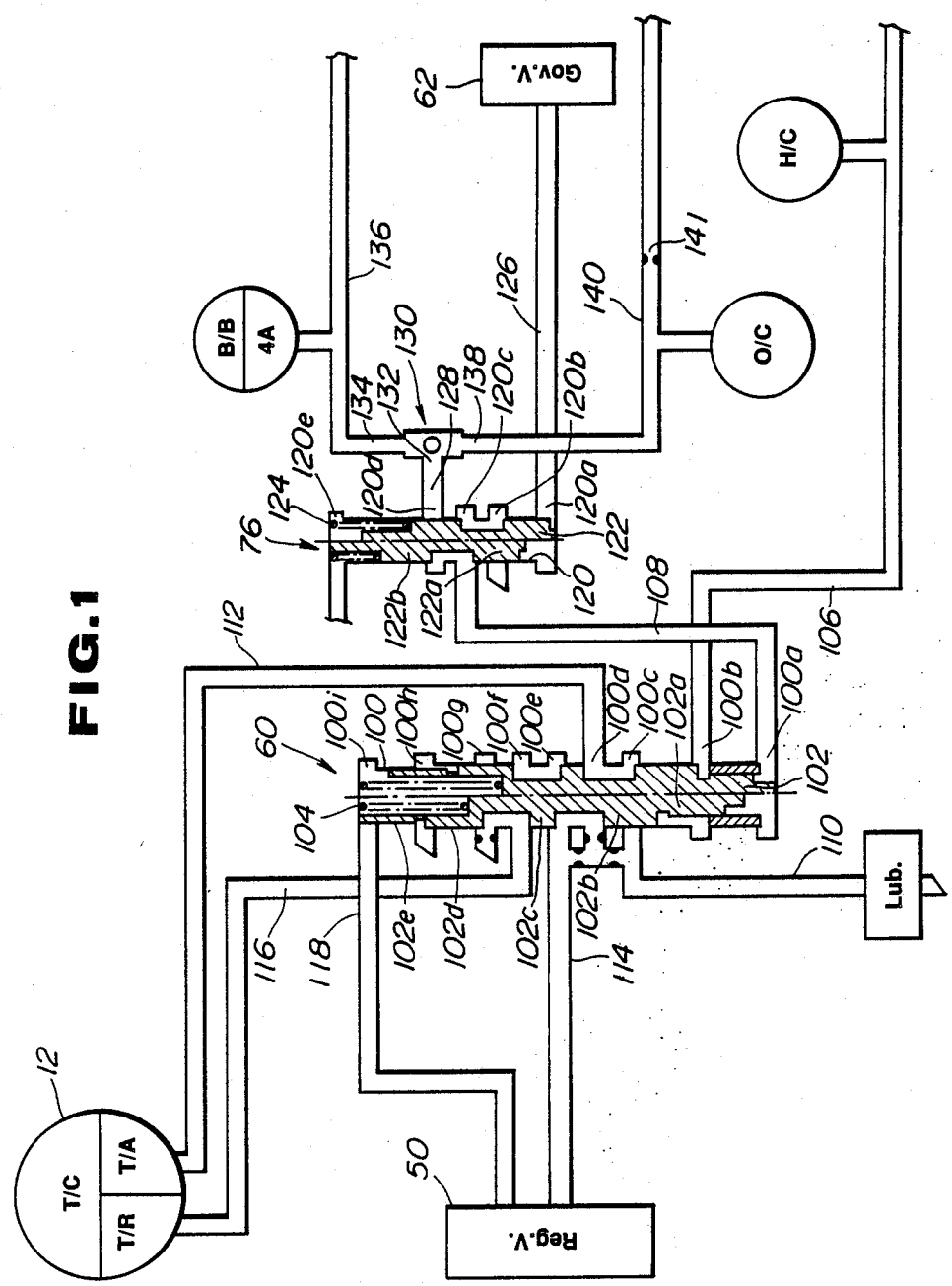
FIG. 1 is a circuit diagram a portion of a hydraulic control system for an automatic transmission showing a preferred embodiment of a lock-up clutch controlling system according to the present invention.

As shown in FIG. 1, the lock-up control valve 60 comprises a spool 102 slidably inserted into a valve bore 100 and a spring 104 biasing the spool 102 down as viewed in FIG. 1. The valve bore 100 is provided with various ports 100a to 100i. The spool 102 has various lands 102a to 102e. Among them, the lands 102b, 102c, and 102d have the same diameter, while lands 102a and 102e have diameters reduced than the above-mentioned three lands with the common diameter. The relationship, in position, of various lands and ports is set as illustrated. The port 100b is connected to a hydraulic line 106 which is connected to the high clutch H/C. The port 100a is connected to a hydraulic line 108 communicating with a port 120c of the vehicle speed cutoff valve 76. The port 100c is connected to a hydraulic line 110 provided for lubrication. The port 100d is connected to a hydraulic line 112 communicating with the apply chamber T/A within the torque converter 12. The port 100e is connected to a hydraulic line 114 which is supplied with a torque converter supply pressure from the pressure regulator valve 50. The port 100f is connected to a hydraulic line 116 which is connected to the release chamber T/R within the torque converter 12. In order to allow flow of hydraulic fluid to the hydraulic line 110 to assure lubrication even during engagement of the lock-up clutch 24, the hydraulic line 112 is connected via the port 100c and orifices to the hydraulic line 110, while the hydraulic line 114 is connected via orifices to the hydraulic line 110. The ports 100g and 100h are drain ports, respectively. The port 100i is connected to a hydraulic line 118 which is supplied with a line pressure from the pressure regulator valve 50. The relationship between a pressure acting area formed on the land 102a, a pressure acting area differential formed between the lands 102b and 102a, a pressure acting area formed on the land 102e, and a bias force of a spring 104 is set as follows. That is, when the both ports 100a and 100b are supplied with the line pressure, the spool 102 is shifted to a position as indicated by a left half thereof as illustrated in FIG. 1 (or an engagement side position). However, when the hydraulic pressure is supplied to only one of the ports 100a and 100b, the spool 102 is shifted to a position as indicated by a right half thereof as illustrated in FIG. 1 (or a release side position).

The vehicle speed cutoff valve 76 comprises a spool 122 slidably inserted into a valve bore 120, and a spring 124 biasing the spool 122 down as viewed in FIG. 1. The valve bore 120 is provided with various ports 120a to 120e. The port 120a is connected to a hydraulic line 126 supplied with a governor pressure from the governor valve 62. The port 120b is a drain port. The port 120c is connected to the above-mentioned hydraulic line 108. The port 120d is connected via a hydraulic line 128 to an output port 132 of the shuttle valve 130. The port 120e is connected to the shuttle valve 140 (see FIG. 4). The spool 122 has two lands 122a and 122b of the same diameter. The relationship between the various ports and lands is set as illustrated in FIG. 1.

The shuttle valve 130 has one inlet port 134 connected to a hydraulic line 136 which is connected to the apply chamber 4A of the band brake B/B which is supplied with a hydraulic pressure during operation with the fourth speed ratio. The other inlet port 138 of the shuttle valve 130 is connected to a hydraulic line 140 which is connected to the overrunning clutch O/C. There is provided in the hydraulic line 140 an orifice 141 at a location upstream of a location where the hydraulic line 140 is connected to the overrunning clutch O/C.

Referring to FIG. 4, the shuttle valve 150 has one inlet port supplied via a hydraulic line 142 with an idle signal pressure from the throttle valve 54. The other inlet port of the shuttle valve 150 is supplied via a hydraulic line 143 with a kickdown signal pressure from the throttle valve 54. A higher one of the both signal pressures is supplied to the port 120e of the vehicle speed cutoff valve 76.

The operation of this embodiment is described. The hydraulic pressure in the hydraulic line 106 is zero during operation with the first speed ratio or the second speed ratio since no hydraulic pressure is supplied to the high clutch H/C. Thus, the spool 102 stays in the release side position regardless of the presence or absence of the hydraulic pressure applied to the port 100a. In this position of the spool 102, the port 100e is allowed to communicate with the port 100f, allowing the hydraulic pressure in the hydraulic line 114 to be supplied to the release chamber T/R via the hydraulic line 116. At the same time, the port 100d is allowed to communicate with the port 100c, allowing the hydraulic fluid in the hydraulic line 112 to flow into the hydraulic line 110. Thus, the hydraulic fluid flows to the release chamber T/R and from the apply chamber T/A side within the torque converter 12, releasing the lock-up clutch 24.

When the transmission shifts to the third speed ratio during the D range mode under a condition where neither the idle signal pressure nor the kickdown signals pressure is supplied to the port 120e (that is, under an engine drive condition other than a kickdown), the hydraulic pressure is supplied to the hydraulic line 106, no hydraulic pressure is supplied to the hydraulic line 136, since the transmission is not shifted to the fourth speed ratio yet, and no hydraulic pressure is supplied to the hydraulic line 140, since the 3-4 shift valve plug 68a stays in a state illustrated by the left half thereof as viewed in FIG. 4 and the overrunning clutch control valve 78 stays in a state as indicated by a left half thereof as viewed in FIG. 4 if the overdrive inhibitor solenoid 84 is in the OFF state. Thus, there is no supply of hydraulic pressure to the hydraulic line 108 regardless of which state the vehicle speed cutoff valve 76 takes. As a result, the spool 102 of the lock-up control valve 60 stays in the position as indicated by the right half thereof as viewed in FIG. 1, leaving the lock-up clutch 24 in the released state. Therefore, the lock-up clutch 24 is released during operation with the third speed ratio under this condition.

When a shift is effected to the four speed ratio with the D range position selected, a hydraulic pressure is supplied to the hydraulic line 136. The hydraulic pressure within the hydraulic line 136 is supplied via the shuttle valve 130 and the hydraulic line 128 to the port 120d of the vehicle speed cutoff valve 76. In the case when the governor pressure from the hydraulic line 126 is higher than a predetermined value, the spool 122 of the vehicle speed cutoff valve 76 takes the position as indicated by the left half thereof as viewed in FIG. 1, allowing the port 120d to communicate with the port 120c. This causes the hydraulic pressure to be delivered from the hydraulic line 128 to the hydraulic line 108, and then to the port 100b of the lock-up control valve 60. Since both of the ports 100b and 100a are now supplied with hydraulic pressure, the spool 102 is shifted to the engagement side position as indicated by the left half thereof as viewed in FIG. 1. In this engagement side position of the spool 102, the port 100d is allowed to communicate with the port 100e, permitting the torque converter supply pressure with the hydraulic line 114 to be supplied to the hydraulic line 122. The hydraulic line 116, on the other hand, is drained via the ports 100f and 100g. This results in the engagement of the lock-up clutch 24. Therefore, the lock-up clutch 24 is engaged during operation with the fourth speed ratio, only. When the governor pressure representative of the vehicle speed is lower than the predetermined value, the spool 122 of the vehicle speed cutoff valve 76 is shifted to the position as indicated by the right half thereof as viewed in FIG. 1, thus draining the hydraulic line 108. Since the hydraulic pressure acting on the port 100a disappears, allowing the spool 102 to take the position as indicated by the right half thereof as viewed in FIG. 1, resulting in the release of the lock-up clutch 24. Therefore, the lock-up clutch 24 is not engaged when the governor pressure representative of the vehicle speed is lower than the predetermined value even during operation with the fourth speed ratio. Even in the D range, if there is supplied the idle signal pressure or the kickdown signal pressure from the throttle valve 54, the spool 122 of the vehicle speed cutoff valve 76 will take the position as indicated by the right half thereof as viewed in FIG. 1 regardless of the magnitude of the governor pressure representative of the vehicle speed. As a result, the spool 102 of the lock-up control valve 60 takes the position as indicated by the right half thereof as viewed in FIG. 1, causing the lock-up clutch 24 to be released.

With the D range position being selected, when the overdrive inhibitor solenoid 86 is turned ON (viz., the engine brake operation state), the 3-4 shift valve plug 68a stays in the position as indicated by the right half thereof as viewed in FIG. 4, so that the hydraulic line 136 is drained to prevent the fourth speed ratio from being established. This causes the spool of the overrunning clutch control valve 78 to take the position as indicated by the left half thereof as viewed in FIG. 4, allowing the hydraulic pressure from the plug 68a to be supplied to the hydraulic line 140 and then to the overrunning clutch O/C. The hydraulic pressure within the hydraulic line 140 is supplied via the shuttle valve 130 to the port 120d of the vehicle speed cutoff valve 76. When the spool 122 of the vehicle speed cutoff valve 76 is subjected to the governor pressure being higher than the predetermined value and thus takes the position as indicated by the left half thereof, the hydraulic pressure applied to the port 120d is supplied via the hydraulic line 108 to the port 100b of the lock-up control valve 60. During operation with the third speed ratio, the hydraulic pressure is also supplied to the port 100b from the hydraulic line 106. This causes the spool 102 of the lock-up control valve 60 to take the position as indicated by the left half thereof as viewed in FIG. 1, resulting in engagement of the lock-up clutch 24. Thus, in the engine brake operation mode, the lock-up clutch 24 is engaged during operation with the third speed ratio. However, since there is no hydraulic pressure supplied to the hydraulic line 106 during operation with the first speed ratio or the second speed ratio, the lock-up clutch 24 is left released during these operations. Similarly to the D range mode, when the idle signal pressure or the kickdown signal pressure is supplied to the port 120e from the throttle valve 54, the lock-up clutch 24 is held released regardless of the magnitude of the governor pressure.

As will be clear from the preceding description, the lock-up clutch 24 is engaged during operation with the highest or the fourth speed ratio only in the D range engine drive operation mode, while it is engaged during operation with the third speed ratio only in the engine brake operation mode. As will be understood from the preceding description, the vehicle speed cutoff valve 76 is not essential in obtaining the function mentioned above. However, the provision of the vehicle speed cutoff valve 76 is operative to prevent unnecessary engagement of the lock-up clutch below a predetermined vehicle speed during operation with the fourth speed ratio or during operation with the third speed ratio.

During a shift from the fourth speed ratio in the lock-up clutch engagement state to the third speed ratio in the lock-up clutch engagement state, which will take place if the overdrive inhibitor solenoid is turned ON during operation with the fourth speed ratio at a high vehicle speed, the lock-up clutch 24 is released momentarily during the shift. That is, during this 4-3 shift, the hydraulic pressure in the hydraulic line 140 increases at a gradual rate although the hydraulic pressure in the hydraulic line 136 drops immediately. The hydraulic fluid is supplied to the overrunning clutch O/C via the orifice 141, and the hydraulic pressure in the hydraulic line 140 downstream of the orifice 141 does not increase during the stroke of the piston of the overrunning clutch O/C. Thus, the hydraulic pressure is held low in the hydraulic line 108 until the hydraulic pressure in the hydraulic line downstream of the orifice 141 increases after completion of the piston stroke. This causes the lock-up clutch 24 to be released. Therefore, this 4—3 shift takes place without any substantial shock.

In the above discussed embodiment, the hydraulic pressure which prohibits the establishment of the fourth speed ratio is produced by the overdrive inhibitor solenoid 84, this hydraulic pressure may be produced by a modified manual valve 52 from a newly provided range port and supplied to the 3-4 shift valve plug 68a.

What is claimed is:

1. In a vehicle:
   a torque converter including a lock-up clutch;
   an automatic transmission following said torque converter, said automatic transmission being shiftable between a plurality of speed ratios including a nth speed ratio and a n−1th speed ratio, where: n is an integer, said automatic transmission including a first friction device which is subject to a first hydraulic pressure during operation with the nth speed ratio when a first predetermined operation range is selected, a second friction device which is subject to a second hydraulic pressure during operation with the n−1th speed ratio when a second predetermined operation range is selected, and a third friction device which is subject to a third hydraulic pressure during operation with each of the nth speed ratio and the n−1th speed ratio when either one of the first or second predetermined operation range is selected;
   a shuttle valve having a first inlet port subject to the first hydraulic pressure, a second inlet port subject to the second hydraulic pressure, and an outlet port, said shuttle valve including means for delivering as an output hydraulic pressure the first hydraulic pressure when said first inlet port is subject to the first hydraulic pressure and the second hydraulic pressure when said second inlet port is subject to the second hydraulic pressure;
   a lock-up control valve including a spool movable between a first position where the lock-up clutch is released, and a second position where the lock-up clutch is engaged, said lock-up control valve including means for biasing said spool toward said first position, said spool having a first pressure acting area, and a second pressure acting area;
   means for transmitting the third hydraulic pressure to said lock-up control valve to have the third hydraulic pressure to act on said first pressure acting area of said spool in such a direction as to urge said spool against said biasing means; and
   means for transmitting the output hydraulic pressure to said lock-up control valve to have the output hydraulic pressure to act on said second pressure acting area of said spool in such a direction as to urge said spool against said biasing means,
   said biasing means being so constructed and arranged as to allow movement of said spool to said second position when the third hydraulic pressure acts on said first pressure acting area and the output hydraulic pressure acts on said second pressure acting area.

2. A vehicle as claimed in claim 1, wherein said output hydraulic pressure transmitting means include means for generating a vehicle speed indicative hydraulic pressure indicative of a rotational speed of a transmission output member, and a vehicle speed cutoff valve fluidly disposed between said outlet port of said shuttle valve and said lock-up control valve, said vehicle speed cutoff valve including spool means responsive to said vehicle speed indicative hydraulic pressure for cutting off the transmission of said output hydraulic pressure to said lock-up control valve.

3. A vehicle as claimed in claim 1, wherein said biasing means include a spring acting on said spool.

4. In a vehicle:
   a torque converter including a lock-up clutch;
   an automatic transmission following said torque converter, said automatic transmission being shiftable between a plurality of speed ratios including a nth speed ratio and an−1th speed ratio, where: n is an integer, said automatic transmission including a first friction device which is subject to a first hydraulic pressure during operation with the n th speed ratio when a first predetermined operation range is selected, a second friction device which is subject to a second hydraulic pressure during operation with the n−1th speed ratio when a second predetermined operation range is selected, and a third friction device which is subject to a third hydraulic pressure during operation with each of the nth speed ratio and the n−1th speed ratio when either one of the first or second predetermined operation range is selected;
   a shuttle valve having a first inlet port subject to the first hydraulic pressure, a second inlet port subject to the second hydraulic pressure, and an outlet port, said shuttle valve including means for delivering as an output hydraulic pressure the first hydraulic pressure when said first inlet port is subject to the first hydraulic pressure and the second hydraulic pressure when said second inlet port is subject to the second hydraulic pressure;
   a lock-up control valve including a spool movable between a first position where the lock-up clutch is released, and a second position where the lock-up clutch is engaged, said lock-up control valve including means for biasing said spool toward said first position, said spool having a first pressure acting area, and a second pressure acting area;
   means for transmitting the third hydraulic pressure to said lock-up control valve to have the third hydraulic pressure to act on said first pressure acting area of said spool in such a direction as to urge said spool against said biasing means;
   means for transmitting the output hydraulic pressure to said lock-up control valve to have the output hydraulic pressure to act on said second pressure acting area of said spool in such a direction as to urge said spool against said biasing means, said biasing means being so constructed and arranged as to allow movement of said spool to said second position when the third hydraulic pressure acts on said first pressure acting area and the output hydraulic pressure acts on said second pressure acting area;

wherein said biasing means include a spring acting on said spool; and said biasing means include pressure regulator valve means for producing a line hydraulic pressure, and means for transmitting said line hydraulic pressure to said lock-up control valve to have said line hydraulic pressure to act on said spool of said lock-up control valve in such a direction as to assist the action of said spring.

5. A system for controlling a lock-up clutch of a torque converter followed by an automatic transmission of a vehicle, the automatic transmission being shiftable between four speed ratios including a fourth speed ratio and a third speed ratio, the automatic transmission including a band brake which is subject to a first hydraulic pressure during operation with the fourth speed ratio when an engine brake operation range is not selected, an overrunning clutch which is subject to a second hydraulic pressure during operation with the third speed ratio when the engine brake operation range is selected, and a high clutch which is subject to a third hydraulic pressure during operation with each of the fourth speed ratio and the third speed ratio regardless of whether or not the engine brake operation range is selected, the system comprising:

a shuttle valve having a first inlet port subject to the first hydraulic pressure, a second inlet port subject to the second hydraulic pressure, and an outlet port, said shuttle valve including means for delivering an output hydraulic pressure when at least one of said first and second inlet ports is pressurized;

a lock-up control valve including a spool movable between a first position where the lock-up clutch is released, and a second position where the lock-up clutch is engaged, said lock-up control valve including means for biasing said spool toward said first position, said spool having a first pressure acting area, and a second pressure acting area;

means for transmitting the third hydraulic pressure to said lock-up control valve to have the third hydraulic pressure to act on said first pressure acting area of said spool in such a direction as to urge said spool against said biasing means; and means for transmitting said output hydraulic pressure to said lock-up control valve to have said output hydraulic pressure to act on said second pressure acting area of said spool in such a direction as to urge said spool against said biasing means, said biasing means being so constructed and arranged as to allow movement of said spool to said second position when the third hydraulic pressure acts on said first pressure acting area and said output hydraulic pressure acts on said second pressure acting area.

* * * * *